United States Patent [19]

Hartnek et al.

[11] 3,852,257

[45] Dec. 3, 1974

[54] SUSPENSION POLYMERIZATION IN THE PRESENCE OF XANTHAN GUM

[75] Inventors: Henry G. Hartnek; Richard A. Empey; David J. Pettitt, all of San Diego, Calif.; Terry L. Van Winkle, Mount Prospect, Ill.

[73] Assignee: Kelco Company, San Diego, Calif.

[22] Filed: Feb. 5, 1973

[21] Appl. No.: 329,522

[52] U.S. Cl..... 260/89.5 AW, 260/17.4 ST, 260/80, 260/89.1, 260/91.1, 260/91.7, 260/92.8 W, 260/93.5
[51] Int. Cl. ............................................. C08f 3/62
[58] Field of Search ......... 260/17.4 ST, 80 M, 89.1, 260/89.5 AW, 92.8 W, 91.1 R, 93.5 W, 56–76, 91.7

[56] References Cited
UNITED STATES PATENTS

| | | | |
|---|---|---|---|
| 2,388,600 | 11/1945 | Collins | 260/8 |
| 3,438,915 | 4/1969 | Girard | 260/17.4 |
| 3,551,366 | 12/1970 | Galinke et al. | 260/17.4 |
| 3,637,563 | 1/1972 | Christena | 260/29.6 |

FOREIGN PATENTS OR APPLICATIONS

| | | | |
|---|---|---|---|
| 656,862 | 9/1951 | Great Britain | 260/17.4 |

Primary Examiner—Melvin Goldstein
Assistant Examiner—Edward Woodberry
Attorney, Agent, or Firm—J. Jerome Behan

[57] ABSTRACT

In one aspect of this invention liquid monomers are polymerized to solid particulate polymer using the well-known suspension polymerization procedures and using as the suspension agent in the polymerization a combination of xanthan gum and polyvinyl alcohol.

In the suspension polymerization of acrylic monomer, such as methyl methacrylate, to obtain solid particulate polymer the use of xanthan gum suspension agent affords an improved product size distribution.

In the suspension polymerization of styrene monomers, such as styrene, to obtain solid polymer, the use of xanthan gum suspension agent in an amount of more than 0.75 weight percent, based on monomer charged, permits the production of particulate polymer.

7 Claims, No Drawings

SUSPENSION POLYMERIZATION IN THE PRESENCE OF XANTHAN GUM

BACKGROUND OF THE INVENTION

1. The Field of the Invention

This invention relates to suspension polymerization. More particularly the invention relates to suspension polymerization in the presence of xanthan gum as suspension agent. Also, the invention relates to suspension polymerization in the presence of xanthan gum and polyvinyl alcohol as combination suspension agents.

2. The Background of the Prior Art

The instant invention is directed to suspension polymerization in its broadest sense, such as, the procedures and monomers and comonomers set out in *Encyclopedia of Polymer Science and Technology*, Vol. 13.

Suspension polymerization is the outgrowth of the old "Bead Process" originally developed for polystyrene production; this is a type of mass polymerization in that small droplets of liquid monomer are dispersed in water and caused to polymerize to solid spherical particles.

The chief problem in suspension polymerization is in the formation and maintenance of a uniform suspension of the monomer droplets as they are slowly transformed from a sticky material to a rigid grandular solid, without coalescence or aggregation of the particles into a conglomerate mass. The operation requires the use of proper agitation and stabilizing agents for maintaining the suspension of the droplets, or particles, with a minimum of interaction.

The procedures used in suspension polymerization are much the same regardless of the monomer charged: The dispersion of the monomer, as a liquid in small droplets, into an agitated stabilizing medium consisting of water containing small amounts of suspension and dispersion agents. The catalyst (initiator) is added to the reaction mixture after the addition of the monomer.

The suspension material is often a protective colloid agent (water soluble high polymers), such as, the widely used protective colloids: carboxymethyl cellulose (CMC), a 1:1 mixture of carboxymethyl cellulose and starch, hydroxyethyl cellulose (HEC), methyl cellulose (MC), polyacrylic acid (PAA), polyvinyl alcohol (PVOH), gelatin, alginates, gum acacia, and gum tragacanth.

SUMMARY OF THE INVENTION

Xanthan gum, as used herein, refers to the biosynthetic polysaccharide elaborated by various species of the Xanthomonas genus of bacteria, wherein said bacteria operate on a substrate of glucose or equivalent sugar. This gum is also referred to in the art as "Xanthomonas hydrophilic colloid," or as "Xanthomonas heteropolysaccharide" or as "Xanthomonas gum." Gum from the *Xanthomonas campestris* species is available from Kelco Company under the tradename "KELZAN" or "KELTROL."

Xanthan gum preparation is described in numerous publications and patents. Some of these are cited and incorporated herein: U.S. Pat. Nos. 3,671,398; 3,594,280; 3,557,016; 3,481,889; 3,438,915; 3,433,708; 3,427,226; 3,391,061; 3,391,060; 3,305,016; 3,271,267; 3,251,749 and 3,020,206.

Combination Suspension Agent Process

It has been discovered that benefits are obtained in the production of solid, particulate polymer by the suspension polymerization of liquid monomer by the use as suspension agent of a combination of xanthan gum and polyvinyl alcohol. Desirably, the combination used has a weight ratio of xanthan gum to polyvinyl alcohol in the range of about 10:1 to 1:10 and, preferably, about 3:1 to 1:3. Preferably, the amount of xanthan gum present is about 0.01 – 2.0 weight based on monomer charge to the process.

The improvement in suspension agent is applicable to all monomers which can be polymerized by the suspension polymerization procedure. Preferably, the suspension agent combination improvement is applied to the monomers: (1) acrylic acid and methacrylic acid and each of their polymerizable derivatives, such as, acrylic acid itself, methyl acrylate, ethyl acrylate, phenylethyl acrylate, methoxyethyl acrylate, methyl methacrylate, ethyl methacrylate, isopropyl methacrylate, phenyl methacrylate, phenylethyl methacrylate, methoxyethyl methacrylate, acrylonitrile and methacrylonitrile. (2) Esters and ethers of vinyl alcohol, such as, vinyl chloride, vinyl acetate, vinyl propionate, vinyl butyrate, vinyl methyl ether, vinyl ethyl ether and vinyl phenyl ether. (3) Vinylidene chloride and (4) styrene and its alpha lower alkyl derivatives, such as, styrene, and alpha methylstyrene.

In one particular embodiment using methyl methacrylate as the monomer, the xanthan gum is present in an amount on the order of 0.1–1 weight percent, specifically about 0.5 percent, based on methyl methacrylate charged, and the weight ratio of the xanthan gum to the polyvinyl alcohol is about 2:1.

In another particular embodiment using styrene as the monomer, the xanthan gum is present in an amount on the order of 0.1 – 0.5 weight percent, based on styrene charged, and the weight ratio of xanthan gum to polyvinyl alcohol is about 2:1.

In still another particular embodiment using styrene as the monomer, the xanthan gum is present in an amount on the order of 2.0 – 4.0 weight percent, based on styrene charged, and the weight ratio of xanthan gum to polyvinyl alcohol is about 2:1.

Xanthan Gum and Acrylic Monomer

It has been discovered that in the suspension polymerization of acrylic monomer to solid, particulate polymer, the use of xanthan gum as the suspension agent gives superior control of polymer particle size distribution. Preferably, the xanthan gum is present in an amount on the order of 0.1 – 2.0 weight percent based on monomer charged; and the preferred monomer is methyl methacrylate.

Xanthan Gum and Styrene Monomer

It has been discovered that in the suspension polymerization of styrene monomer to obtain solid, particulate polymer using xanthan gum as the suspension agent, it is necessary to use more than 0.75 weight percent of the gum, based on monomer charged, in order to have an operable process. Preferably the xanthan gum is present in an amount of about 1–4 percent; and the preferred monomer is styrene itself.

DESCRIPTION OF THE EXAMPLES

Apparatus

A 1,000 ml resin flask fitted with a thermometer, reflux condenser, stirring bearing, glass stirring rod and Teflon stirring blade.

Materials

The methyl metacrylate and styrene monomers and the methyl cellulose (MC) were obtained from Atlas Chemical Co., San Diego, Calif. The polyacrylic acid, (PAA) benzoyl peroxide and lauryl peroxide were obtained from Pfaultz and Bauer Inc., Flushing, N.Y. The hydroxyethyl cellulose PQ-300 (HEC) was obtained from Hercules Inc., Wilmington, Del. The PVOH used as a suspending agent alone was obtained from Airco Chemical Co., New York, N.Y.; PVOH (Gelvito 20-90) obtained from Shawinigan Resin Corp., Springfield, Mass., was used in the combination agent examples. The xanthan gum was Kelco Company KELZAN.

Standard Procedure

To the 1,000 ml resin flask, fitted as described above, were added 350 ml distilled water, and the particular suspending agent. The mixture was stirred for 15 min. to dissolve the suspending agent. 100 gm of monomer were then added followed by the initiator. The reaction mixture was then heated to reflux on a boiling water bath and allowed to react while stirring at 600 rpm.

The polymer product was isolated by filtering through filter cloth on a Buechner funnel, washed three times with distilled water and once with methanol and dried under vacuum at 50° C.

The yield, porosity, density, 10 percent viscosity in benzene and screen mesh size were then determined on the dried finished polymer.

Xanthan Gum Suspension Agent and Styrene Monomer

Illustrative Example 33: Styrene was polymerized using 5 weight percent, based on styrene charge, of polyvinyl alcohol (PVOH) as suspension agent. The polymer product formed one solid mass around the stirring rod.

Illustrative Example 34: Styrene was polymerized using polyacrylic acid (PAA) as the suspension agent. Amounts of PAA, based on the styrene charge, of 1.8 weight percent or less present in the polymerization zone resulted in polymer product in the form of one solid mass around the stirring rod.

EXAMPLE 1

When styrene was polymerized using KELZAN brand of xanthan gum as the suspension agent, the presence of 0.75 weight percent gum, or less, based on styrene charge, in the polymerization zone resulted in polymer product in the form of one solid mass around the stirring rod. (Hereinafter the amount of suspension agent used is to be understood as "weight percent based on the amount of monomer charge to the polymerization zone.")

EXAMPLES 2–6

Styrene was polymerized using 1.00 – 4.00 weight percent of KELZAN brand xanthan gum as the suspension agent. All of these examples produced particulate, solid polymer. The results of these examples are set out in Table I.: Yield of polymer in weight percent of styrene charge; the porosity and the apparent density and the viscosity of a 10 weight percent solution of the polymer product in benzene; the polymer particle size distribution determined by screen analysis is given by screen mesh size and by the microns corresponding to the screen mesh size.

Discussion of Table I

Example 2 shows a remarkable product distribution in that almost 86 percent of the particles fall in the 20 mesh and 30 mesh size. As the amount of gum present is increased the polymer particle size decreases, but the product particle size distribution maintains a very narrow range: Example 3 has 97 percent in the 20, 30 and 40 mesh size range. Example 4 has 96 percent in the 30, 40 and 60 mesh size range. Example 5 has 77 percent in the 60 and 80 mesh size range and 14 percent in the 100 and 150 mesh size range. Example 6 has 88 percent in the 100, 150 and 200 mesh size range. The polymer trade wants particles of a uniform size or falling in a narrow size range. The instant process shows in Table I an ability to afford polystyrene product particles of a narrow size range and with the added ability of maintaining this desired narrow

TABLE I

Xanthan Gum (1) Suspension Agent and Styrene Monomer

| EXAMPLE | | 1. | 2. | 3. | 4. | 5. | 6. |
|---|---|---|---|---|---|---|---|
| | | \multicolumn{6}{c}{Wt.% Gum Based on Monomer Charge} | | | | | |
| | | 0.75 | 1.00 | 1.50 | 2.00 | 3.00 | 4.00 |
| Yield, Wt.% | | (2) | 98.30 | 97.00 | 96.00 | 96.00 | 95.00 |
| Porosity | | | 25.00 | 31.00 | 33.00 | 40.00 | 50.00 |
| Density | | | 1.06 | 1.06 | 1.07 | 1.07 | 1.07 |
| 10% Vis. in Benzene | | | 6.50 | 7.50 | 8.50 | 10.50 | 11.50 |
| Polymer Size | | | | | | | |
| Microns | Mesh | | | | | | |
| 840 | 20 | | 67.20 | 30.70 | 0.90 | 0.50 | — |
| 590 | 30 | | 28.60 | 53.30 | 22.50 | 1.90 | 0.10 |
| 420 | 40 | | 3.00 | 13.10 | 50.10 | 3.80 | 0.20 |
| 250 | 60 | | 0.60 | 2.10 | 23.30 | 43.80 | 0.90 |
| 177 | 80 | | 0.30 | 0.40 | 2.20 | 33.10 | 7.40 |
| 149 | 100 | | 0.30 | 0.40 | 0.50 | 7.60 | 27.90 |
| 105 | 150 | | — | — | 0.50 | 6.60 | 40.80 |
| 74 | 200 | | — | — | — | 2.50 | 18.80 |
| 44 | 325 | | — | — | — | 0.20 | 3.70 |
| <44 | <325 | | — | — | — | — | 0.20 |

(1) Kelco Company KELZAN.
(2) Products formed one solid mass using 0.75% or less gum.

size range over a wide range of sizes obtainable by controlling the amount of xanthan gum suspension agent used in the process.

Also, it has been found that increase in the amount of xanthan gum used results in still further decrease in the polystyrene product size but usage much in excess of the 4 percent shown ceases to afford significant size decrease. Very large amounts of xanthan gum tend to decrease the yield of polymer product somewhat.

Various Suspension Agents and Methyl Methacrylate Monomer

Illustrative Examples 7–12 are directed to the results obtainable using methyl methacrylate as the polymerizable monomer in the suspension polymerization procedure described hereinabove. Each illustrative example was carried out with a different suspension agent, each of which is known to be utilized in commercial operations with this particular monomer, namely: hydroxyethylcellulose (HEC), carboxymethylcellulose (CMC), CMC plus starch, polyacrylic acid (PAA), polyvinyl alcohol (PVOH), and methylcellulose (MC).

The results of these illustrative examples 7–12 plus example 13 directed to KELZAN brand xanthan gum are set out in Table II.

Discussion of Table II

Many of the widely used agents have to be worked up before reaction. For example in the standard mixture of 1:1 CMC and starch used in the suspension polymerization of methyl methacrylate, the starch requires cooking which means the solution must be heated to dissolve the starch and then cooled prior to addition of CMC, monomer and initiator. A KELZAN gum solution by comparison requires only 15 minutes at room temperature to prepare the reaction medium.

The data of Table II demonstrate that xanthan gum compares favorably in yield, porosity, density and viscosity with the best of the commercially used suspension agents.

The product polymer particle size distributions shows a great advantage for the use of xanthan gum suspension agent at these conditions. Example 13 (xanthan gum) shows 61 percent is in the single mesh size of 100; 74 percent is in the 100 and 150 mesh size; only 3 percent is in excess of 80 mesh size.

The best of the other suspension agents, HEC in example 7, shows 70 percent within the 40 to 100 mesh size range with most of the particles in the two larger mesh sizes; and about an even distribution over the 150–325 mesh sizes. The widely used CMC+Starch combination has more polymer in the desired smaller particle sizes but the product is 87 percent fairly distributed over the five mesh sizes of 60 to 200. PAA gave 92 percent with the larger mesh sizes of 20–40, with 55 percent in the largest size of 20 mesh. It is concluded that these data show an unexpected superiority in the use of xanthan gum as the suspension agent.

Xanthan Gum Suspension Agent with Methyl Methacrylate Monomer

Examples 14–18 demonstrate the results obtainable with KELZAN brand of xanthan gum as the suspension agent in the polymerization of methyl methacrylate monomer over the range of 0.10 to 1.00 percent. (Actually Example 18 is identical to Example 13; it has been reinserted here and renumbered for convenience in the presentation.) The results of these examples 14–18, where xanthan gum was the only suspension agent, are set out in Table III.

Discussion of Table III (Examples 14–18):

These examples show the narrow product polymer particle

TABLE II

Various Suspension Agents and Methylmethacrylate Monomer

| ILLUSTRATIVE EXAMPLE | | 7. 1% HEC | 8. 1% CMC | 9. 1% CMC+ 1% Starch | 10. 1.8% PAA | 11. 2.0% PVOH | 12. 1% MC | 13. 1% KELZAN |
|---|---|---|---|---|---|---|---|---|
| Yield, Wt. % | | 92.8 | 90.6 | 90.2 | 94.4 | (1) | (1) | 91.0 |
| Porosity | | 41 | 36 | 45 | 28 | | | 45 |
| Density | | 1.16 | 1.11 | 1.10 | 1.10 | | | 1.14 |
| 10% Vis. in benzene | | 284 | 183 | 185 | 180 | | | 255 |
| Polymer Microns | Size Mesh | | | | | | | |
| 840 | 20 | 0.5 | 4.6 | 0.7 | 55.5 | | | — |
| 590 | 30 | 1.8 | 8.0 | 1.1 | 20.2 | | | — |
| 420 | 40 | 28.4 | 14.3 | 1.7 | 16.7 | | | 0.4 |
| 250 | 60 | 16.0 | 48.3 | 9.9 | 6.3 | | | 2.8 |
| 177 | 80 | 13.8 | 14.8 | 19.9 | 0.8 | | | 8.7 |
| 149 | 100 | 11.5 | 5.4 | 20.6 | 0.9 | | | 60.8 |
| 105 | 150 | 8.7 | 2.6 | 25.4 | — | | | 13.6 |
| 74 | 200 | 6.6 | 1.0 | 11.3 | — | | | 6.8 |
| 44 | 325 | 7.1 | 0.4 | 6.9 | — | | | 4.8 |
| <44 | <325 | 4.6 | — | 2.5 | — | | | 2.1 |

(1) Products formed one solid mass

TABLE III

(Methylmethacrylate Monomer)

| EXAMPLE | 14 | 15 | 16 | 17 | 18 | 19 | 20 | 21 | 22 | 23 |
|---|---|---|---|---|---|---|---|---|---|---|
| Xanthan Gum Alone (1) | | | | | | | 2:1 Wt. Ratio Xanthan Gum (1): Polyvinyl Alcohol (2) | | | |
| Wt % Gum Based on Monomer | | | | | | | Wt. % Gum Based on Monomer | | | |
| | 0.10 | 0.30 | 0.50 | 0.75 | 1.00 | 0.10 | 0.30 | 0.50 | 0.75 | 1.00 |
| Yield, Wt. % | 96.5% | 93.3 | 92.5 | 91.8 | 91.0 | 93.8 | 93.0 | 92.6 | 91.0 | 90.8 |
| Porosity | 29 | 32 | 37 | 40 | 45 | 38 | 42 | 50 | 52 | 55 |

TABLE III—Continued (Methylmethacrylate Monomer)

| EXAMPLE | | 14 | 15 | 16 | 17 | 18 | 19 | 20 | 21 | 22 | 23 |
|---|---|---|---|---|---|---|---|---|---|---|---|
| | | Xanthan Gum Alone (1) | | | | | | 2:1 Wt. Ratio Xanthan Gum (1): Polyvinyl Alcohol (2) | | | |
| Wt % Gum Based on Monomer | | | | | | | | Wt. % Gum Based on Monomer | | | |
| | | 0.10 | 0.30 | 0.50 | 0.75 | 1.00 | 0.10 | 0.30 | 0.50 | 0.75 | 1.00 |
| Density | | 1.08 | 1.10 | 1.11 | 1.12 | 1.14 | 1.12 | 1.13 | 1.15 | 1.15 | 1.16 |
| 10% Vis. in Benzene | | 178 | 218 | 227 | 240 | 255 | 214 | 232 | 253 | 273 | 296 |
| Polymer Size | | | | | | | | | | | |
| Microns | Mesh | | | | | | | | | | |
| 840 | 20 | 38.4 | 20.2 | 0.4 | — | — | 3.3 | 0.6 | 0.1 | — | — |
| 590 | 30 | 32.1 | 39.8 | 0.5 | 0.4 | — | 3.5 | 1.9 | 0.2 | 0.3 | — |
| 420 | 40 | 20.2 | 24.3 | 4.1 | 2.1 | 0.4 | 3.7 | 6.4 | 0.4 | 2.0 | 0.2 |
| 250 | 60 | 7.8 | 14.0 | 81.3 | 7.6 | 2.8 | 22.8 | 9.3 | 3.9 | 4.6 | 0.2 |
| 177 | 80 | 1.0 | 0.9 | 6.1 | 68.7 | 8.7 | 28.0 | 17.6 | 11.0 | 9.8 | 0.3 |
| 149 | 100 | 0.5 | 0.8 | 4.1 | 11.8 | 60.8 | 14.2 | 30.1 | 10.3 | 14.2 | 1.8 |
| 105 | 150 | — | — | 2.5 | 4.7 | 13.6 | 12.7 | 14.8 | 41.7 | 26.4 | 20.8 |
| 74 | 200 | — | — | 0.7 | 2.8 | 6.8 | 8.5 | 5.4 | 14.0 | 27.3 | 34.8 |
| 44 | 325 | — | — | 0.3 | 0.7 | 4.8 | 1.8 | 2.9 | 6.8 | 9.8 | 36.7 |
| <44 | <325 | — | — | — | 0.2 | 2.1 | 0.4 | 0.9 | 1.5 | 4.5 | 5.2 | size distribution obtained with xanthan gum even in the larger sizes obtained with the very low usage of the gum. Example 16, 0.5 percent gum usage, shows an extraordinary product with 81 percent in the single size of 60 mesh. Example 17. 0.75 percent usage, shows 69 percent in the single size of 80 mesh. Example 18, 1.0 percent usage, shows 61 percent in the single size of 100 mesh. These three examples also show that the bulk of the product is concentrated in the high yield size and the mesh size on either side of the high yield size. This type of selectivity is unknown to commercial polymerization at this time.

The Combination of Xanthan Gum and Polyvinyl Alcohol as the Suspension Agent in the Polymerization Xanthan Gum and Polyvinyl Alcohol with Methyl Methacrylate Monomer

Examples 19-23:

Purely as a matter of convenience, the examples using the combination suspension agent of the invention show the weight percent of xanthan gum used and the weight ratio of xanthan gum to polyvinyl alcohol used in the particular example. Thus, in Example 21, the xanthan gum usage was 0.50 percent and the polyvinyl alcohol usage was 0.25 percent for a total combination agent usage of 0.75 percent. The results of Examples 19-23, covering the range of gum usage from 0.10 percent to 1.00 percent and polyvinyl alcohol usage from 0.05 to 0.50 percent, are set out in Table III.

Discussion of Table III (Examples 19-23):

In Example 11, Table II, 2 percent of PVOH was not enough to give a particulate product. In these Examples 19-23, the combination suspension agent produced not only particulate polymer product but also product tending to be in the smaller sizes desired by the art.

Comparison of the results of Examples 19-23 with those of illustrative Examples 7-10 demonstrates the almost astonishing greater efficiency of the combination agents — xanthan gum and polyvinyl alcohol. Example 20, at a total of 0.45 percent combination agent, shows yield, porosity, density and product particle distribution essentially equal to that of illustrative Example 9, at 1 percent CMC plus 1 percent starch; and a substantially higher molecular weight as shown by the higher viscosity of the benzene solution.

At about the same molecular weight polymer product the combination xanthan gum and PVOH agent gives a better particle size than those of the hydroxyethylcellulose of Example 14 at about the same suspension agent usage.

Discussion of Table III: Xanthan Gum Alone v. the Combination Agent

A comparison of the data of xanthan gum alone and the combination agent shows that the combination produces much more porous product polymer than xanthan gum alone at a total equivalent usage. Also the density of the product of the combination agent examples is higher than that of the equivalent xanthan gum alone process. However, it is the higher viscosity product obtained in the combination agent process that is the striking benefit of the use of the combination agent of the invention.

Although the particle size range of the combination agent process is not that of the narrow range of the xanthan gum alone process, the product is as good or better than that obtained by the known generally used agents. And the combination agent process of the invention has very impressive benefits over the known agents in the ability to put together high porosity and density and higher viscosity product with the smaller size particles desired by the art.

Xanthan Gum and Polyvinyl Alcohol with Styrene Monomer

Examples 24-32 were carried out polymerizing styrene using KELZAN brand xanthan gum plus polyvinyl alcohol suspension agents at a weight ratio of gum to alcohol of 2:1 and a range of gum usage ranging from 0.10 to 4.00 percent. The results of these examples are set out in Table IV.

Discussion of Table IV (Examples 24-32):

Illustrative Example 33, page 7 above, shows that at 5 percent of PVOH, styrene is not polymerized to a particulate polymer in the procedure used herein. However, using the combination agent particulate polymer product is produced in high yield at a usage of only 0.1 percent xanthan gum plus 0.05 percent PVOH and this production continues at high yield even at 4.0 percent gum plus 2.0 percent PVOH.

It is of interest and value to the art that the product particle size distribution maintains a three mesh size range decreasing one mesh size with about 0.2 percent increase in the amount of gum present. Also of interest is the production of high molecular weight product at the usage of 2.0–4.0 percent of gum with the particle size in this range of gum usage being about 80 percent concentrated in the 150 and 200 mesh sizes; the porosity in excess of 55 is of value for purposes where the product is to be filled or reinforced.

Comparison of Table IV and Table I:

Example 1, Table I, shows that xanthan gum agent alone at 0.75 percent did not produce particulate polystyrene. Using the combination agent as little as 0.1 percent gum plus 0.05 percent PVOH gave particulate polystyrene with a larger size but narrow range product.

TABLE IV

2:1 Wt. Ratio of Xanthan Gum (1): Polyvinyl Alcohol (2) (Styrene Monomer)

| EXAMPLE | 24 | 25 | 26 | 27 | 28 | 29 | 30 | 31 | 32 |
|---|---|---|---|---|---|---|---|---|---|
| | | | | % Gum Based on Monomer | | | | | |
| | 0.10 | 0.30 | 0.50 | 0.75 | 1.00 | 1.50 | 2.00 | 3.00 | 4.00 |
| Yield, Wt. % | 98.9 | 98.0 | 97.2 | 95.3 | 93.3 | 92.6 | 91.2 | 90.8 | 98.7 |
| Porosity | 29 | 31 | 35 | 40 | 48 | 52 | 55 | 57 | 60 |
| Density | 1.03 | 1.03 | 1.03 | 1.05 | 1.05 | 1.06 | 1.06 | 1.07 | 1.07 |
| 10% Vis. in Benzene | 5.0 | 5.0 | 7.5 | 10.0 | 11.0 | 12.5 | 15.5 | 16.5 | 18.5 |
| Polymer Size | | | | | | | | | |
| Microns / Mesh | | | | | | | | | |
| 840 / 20 | 35.8 | 4.4 | 0.2 | — | — | — | — | — | — |
| 590 / 30 | 47.0 | 25.1 | 1.2 | 0.3 | 0.2 | — | — | — | — |
| 420 / 40 | 13.6 | 44.1 | 14.2 | 3.1 | 1.4 | 0.4 | — | — | — |
| 250 / 60 | 3.0 | 21.9 | 44.4 | 14.2 | 7.9 | 3.8 | 0.4 | 0.3 | 0.3 |
| 177 / 80 | 0.6 | 3.8 | 18.2 | 28.6 | 17.5 | 11.0 | 2.2 | 1.6 | 1.6 |
| 149 / 100 | — | 0.7 | 8.3 | 23.3 | 27.6 | 21.4 | 8.4 | 10.0 | 8.8 |
| 105 / 150 | — | — | 6.7 | 14.2 | 20.2 | 33.8 | 52.6 | 55.3 | 39.6 |
| 74 / 200 | — | — | 3.4 | 7.9 | 13.4 | 17.2 | 25.9 | 25.9 | 40.8 |
| 44 / 325 | 13 | — | 2.3 | 6.4 | 9.4 | 9.8 | 8.7 | 4.4 | 6.1 |
| <44 / <325 | — | — | 1.1 | 2.0 | 2.4 | 2.6 | 2.6 | 2.5 | 2.7 |

(1) Kelco Company KELZAN.
(2) Shawingen Resin Corp. Gelvitol 20–90.

At equivalent xanthan gum usage, the gum alone process gives product of larger size than the combination agent process; however, both processes give a narrow range of particle sizes.

The combination process gives a definitely more porous product than the xanthan gum alone process at equivalent agent usage.

The dramatic advantage of the combination agent process lies in the much higher molecular weight product at equivalent agent usage. Example 26, at 0.5 percent gum plus 0.25 percent PVOH has a 10 percent viscosity of 7.5; Example 3 at 1.5 percent gum alone has the same viscosity product. Example 30, at 2.0 percent gum plus 1.0 percent PVOH, has a producct viscosity of 15.5; Example 5 at 3.0 percent gum alone has a product viscosity of 10.5; Example 6, at 4.0 percent gum alone, has a product viscosity of 11.5. At 4.5 percent total agent, Example 31 has a viscosity of 16.5.

Effect of Agitation Rate

It is known that the degree of agitation in the polymerization zone effects the type of polymer product obtained. Some tests were carried out using the standard procedure herein except that the speed of the stirring rod was changed from test to test. The monomer charged was styrene and the suspension agent was a combination of xanthan gum, 0.5 percent, and PVOH, 0.25 percent. At speeds slower than the standard 600, the molecular weight of the product decreased noticeably; the particles were somewhat larger but maintained a narrow range of mesh sizes. At speeds above 600 rpm. the porosity increased and the molecular weight increased; the product particle for a time held a reasonably narrow mesh size but this spread as the speed increased. At extreme speeds much of the monomer was left in the water portion of the system in the form of a tight emulsion. Reasonable variations in agitation of the polymerization mixture do not affect the benefits set out herein above for the processes of this invention.

Thus having described the invention, what is claimed is:

1. In the process for the aqueous suspension polymerization of a liquid monomer to a particulate polymer, where the monomer is acrylic acid or its polymerizable derivatives, methacrylic acid or its polymerizable derivatives, esters or ethers of vinyl alcohol, vinylidene chloride, styrene or methylstyrene, the method for obtaining particulate polymer of essentially uniform particle size that comprises conducting the polymerization in the presence of from about 0.1 to 4.0 percent by weight of xanthan gum.

2. The process of claim 1 wherein the monomer is acrylic acid or a polymerizable derivative thereof and the xanthan gum is present at from about 0.1 to 1.0 percent by weight of monomer.

3. The process of claim 1 wherein the monomer is styrene or methylstyrene and the xanthan gum is present at from about 1–4 percent by weight of monomer.

4. The process of claim 1 wherein the polymerization is carried out in the presence of xanthan gum and polyvinyl alcohol, and the weight ratio of xanthan gum to polyvinyl alcohol is from about 10:1 to 1:10.

5. The process of claim 4 wherein the weight ratio of xanthan gum to polyvinyl alcohol is from about 3:1 to 1:3.

6. The process of claim 5 wherein the monomer is acrylic acid or a polymerizable derivative thereof and the weight of xanthan gum is in excess of 0.75 percent by weight of monomer.

7. The process of claim 5 wherein the monomer is styrene and the weight of xanthan gum is from about 0.1 to 4.0 percent by weight of monomer.

* * * * *